United States Patent
Heizenroeder (10) Patent No.: US 11,054,295 B2
(45) Date of Patent: *Jul. 6, 2021

(54) PRESSURE REGULATING DEVICES AND RELATED SYSTEMS AND METHODS

(71) Applicant: Sensus Spectrum, LLC, Morrisville, NC (US)

(72) Inventor: Christian Heizenroeder, Durham, NC (US)

(73) Assignee: Sensus Spectrum, LLC, Morrisville, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/275,671

(22) Filed: Feb. 14, 2019

(65) Prior Publication Data

US 2020/0264027 A1 Aug. 20, 2020

(51) Int. Cl.
*G01F 15/06* (2006.01)
*G01F 15/14* (2006.01)
(Continued)

(52) U.S. Cl.
CPC ............ *G01F 15/063* (2013.01); *E03B 7/071* (2013.01); *G01F 5/005* (2013.01); *G01F 15/14* (2013.01); *Y10T 137/7761* (2015.04)

(58) Field of Classification Search
CPC ............ Y10T 137/7761; G01F 15/063; G01F 15/005; E03B 15/005; E03B 7/071;
(Continued)

(56) References Cited

U.S. PATENT DOCUMENTS 3,990,299 A 11/1976 Coffman
4,768,548 A * 9/1988 Maurer ............... G05D 16/2086
137/487.5

(Continued)

FOREIGN PATENT DOCUMENTS

CN 203049674 U 7/2013
CN 103243775 A 8/2013
WO WO 2014/040823 A1 3/2014

OTHER PUBLICATIONS

Notification of Transmittal of the International Search Report and the Written Opinion of the International Searching Authority, or the Declaration, PCT/US2018/026658, dated Jul. 10, 2018, 14 pages.

(Continued)

*Primary Examiner* — William M McCalister
(74) *Attorney, Agent, or Firm* — Stanek Lemon Crouse & Meeks, PA (57) ABSTRACT

Pressure regulating systems are provided. The pressure regulating systems include a pressure sensor configured to sense pressure of water flowing through a pressure regulating device; an actuator coupled to the pressure sensor; an electronics module configured to receive pressure information related sensed pressure from the pressure sensor and process the received pressure information; and a radio module coupled to the device and configured to receive the processed sensor information from the electronics module, communicate the processed sensor information to a remote location and receive pressure adjustment information from the remote location. The received pressure adjustment information is used to adjust water pressure in the water network from the remote location.

13 Claims, 5 Drawing Sheets

(51) Int. Cl.
  *E03B 7/07* (2006.01)
  *G01F 5/00* (2006.01)

(58) Field of Classification Search
  CPC ............... E03B 7/075; G05D 16/2006; G05D 16/2013; G05D 16/202; G05D 16/2022
  USPC ...................................................... 137/487.5
  See application file for complete search history.

(56) References Cited

U.S. PATENT DOCUMENTS

| | | | | | |
|---|---|---|---|---|---|
| 5,954,089 | A | * | 9/1999 | Seymour | F16K 31/0675 137/487.5 |
| 6,994,309 | B2 | * | 2/2006 | Fernandez-Sein | F16K 37/0091 251/129.04 |
| 7,314,059 | B2 | * | 1/2008 | Schuetze | G05D 27/02 137/102 |
| 8,176,936 | B2 | * | 5/2012 | Naganuma | F16K 37/00 137/557 |
| 8,905,063 | B2 | * | 12/2014 | Young | F23N 1/002 137/487.5 |
| 9,563,207 | B2 | * | 2/2017 | Aughton | G05D 7/067 |
| 9,863,425 | B2 | * | 1/2018 | Kallesoe | E03B 7/075 |
| 10,006,555 | B2 | * | 6/2018 | Arazi | F16K 31/10 |
| 2002/0189362 | A1 | * | 12/2002 | Havlena | G01F 1/34 73/702 |
| 2006/0076426 | A1 | * | 4/2006 | Schuetze | G05D 27/02 237/12 |
| 2007/0284293 | A1 | * | 12/2007 | Pitchford | G01D 4/004 210/85 |
| 2008/0150750 | A1 | * | 6/2008 | Parris | G01D 4/002 340/870.02 |
| 2010/0168927 | A1 | * | 7/2010 | Burrows | E03B 1/00 700/282 |
| 2011/0178644 | A1 | * | 7/2011 | Picton | E03B 7/071 700/282 |
| 2011/0303310 | A1 | * | 12/2011 | Klicpera | B05B 12/008 137/551 |
| 2013/0153798 | A1 | * | 6/2013 | Kucera | F23N 1/002 251/129.01 |
| 2014/0238511 | A1 | * | 8/2014 | Klicpera | E03B 7/071 137/551 |
| 2014/0343734 | A1 | * | 11/2014 | Meyer | G05B 15/02 700/282 |
| 2015/0057816 | A1 | * | 2/2015 | Schick | G05D 23/1919 700/282 |
| 2016/0132061 | A1 | * | 5/2016 | Palmer | G05D 16/2013 137/487.5 |
| 2016/0161310 | A1 | * | 6/2016 | Leaders | G01F 1/663 702/48 |
| 2017/0196204 | A1 | * | 7/2017 | Willis | A01K 39/02 |
| 2018/0230681 | A1 | * | 8/2018 | Poojary | G01F 15/063 |
| 2018/0292248 | A1 | * | 10/2018 | Heizenroeder | E03B 7/075 |
| 2019/0101411 | A1 | * | 4/2019 | Davis | H02J 7/00 |
| 2019/0135657 | A1 | * | 5/2019 | Yates | G01M 3/28 |
| 2019/0234786 | A1 | * | 8/2019 | Klicpera | G01F 15/063 |
| 2020/0011722 | A1 | * | 1/2020 | Romer | G01F 15/0755 |

OTHER PUBLICATIONS

Notification Concerning Transmittal of International Preliminary Report on Patentability, PCT/US2018/026658, dated Oct. 15, 2019, 9 pages.

International Search Report and the Written Opinion, PCT/US2020/012665, dated Mar. 1, 2020, 10 pages.

* cited by examiner

FIG. 5

PRESSURE REGULATING DEVICES AND RELATED SYSTEMS AND METHODS

RELATED APPLICATIONS

The present application is related to U.S. patent application Ser. No. 15/947,990 filed on Apr. 9, 2018, which claims priority to U.S. Provisional Application No. 62/483,604, filed Apr. 10, 2017, entitled Water Meter Having Integrated Pressure Reducing Value, the content of which are hereby incorporated herein by reference as if set forth in their entirety.

FIELD

The present inventive concept relates generally to pressure regulation and, more particularly, to remotely controlling pressure within water networks.

BACKGROUND

Regulating water pressure is currently a manual process that typically requires a lot of resources and manpower. In particular, when water pressure needs to be adjusted, a contractor is typically hired to come to the house, crawl under the house and adjust the water pressure to a desired level by, for example, adjusting the pressure regulation valve (PRV). If the customer is not satisfied with the water pressure, the contractor generally must return to the home of the customer and repeat the process.

SUMMARY

Some embodiments of the present inventive concept provide pressure regulating systems including a pressure sensor configured to sense pressure of water flowing through the a pressure regulating device; an actuator coupled to the pressure sensor; an electronics module configured to receive pressure information related sensed pressure from the pressure sensor and process the received pressure information; and a radio module coupled to the device and configured to receive the processed sensor information from the electronics module, communicate the processed sensor information to a remote location and receive pressure adjustment information from the remote location. The received pressure adjustment information is used to adjust water pressure in the water network from the remote location.

In further embodiments, the pressure regulating system may further include a temperature sensor. The electronics module may be further configured to receive temperature information from the temperature sensor and process the received temperature information along with the received pressure information.

In still further embodiments, the received pressure adjustment information may instruct the electronics module to one of increase water pressure of the water flowing through the device; decrease water pressure of the water flowing through the device; and shut off the water flowing through the device.

In some embodiments, the pressure regulating system may be positioned in one of a residential home, a commercial building, a water line and a pump station.

In further embodiments, the electronic module may be further configured to store the received pressure information and process the received pressure information to provide the processed pressure information to the remote location via a radio module.

In still further embodiments, the device may further include a device housing and the radio module may be one of inside the device housing and separate from the device housing.

Some embodiments of the present inventive concept provide a pressure regulating device including a housing and an integrated pressure control valve inside the housing. The integrated pressure control valve is configured to receive instructions from a remote location to increase and/or decrease water pressure of water flowing through the device.

In further embodiments of the present inventive concept, the pressure regulating device may further include an actuator and an electronics module. The actuator may be coupled to the integrated pressure control valve configured to measure pressure of the water flowing through the device. The electronics module may be coupled to the actuator and configured to receive the measured pressure of the water flowing through the device and communicate the received pressure of the water flowing through the device to a remote location via a radio module coupled to the device.

In still further embodiments, the actuator may include one of a motor, a coil and other type of actuator.

In some embodiments, the radio module is one of integrated into the housing and separate from the housing.

In further embodiments, the device may further include a temperature sensor coupled to the electronics module. The electronics module may be further configured to receive temperature information from the temperature sensor and communicate the received temperature information along with the pressure of the water flowing through the device to a remote location via a radio module coupled to the device.

Still further embodiments of the present inventive concept provide methods of remotely adjusting pressure in a water network. The methods include sensing pressure of water flowing through the a pressure regulating device; receiving the sensed pressure of the water flowing through the device at an electronics module in the device; processing the received sensed pressure at the electronics module to provided processed pressure information; providing the processed pressure information to a remote location via a radio module; receiving pressure adjustment information from the remote location via the radio module; and adjusting the pressure of the water flowing through the water network based on the received pressure adjustment information from the remote location.

In some embodiments, the method may further include sensing a temperature of the water flowing through the device; receiving the sensed temperature of the water flowing through the device at the electronics module in the device; processing the received sensed temperature at the electronics module to provide processed temperature information; providing the processed temperature information to the remote location via a radio module with the processed pressure information; receiving pressure adjustment information from the remote location via the radio module responsive to both the processed pressure information and the processed temperature information; and adjusting the pressure of the water flowing through the device based on the received pressure adjustment information.

In further embodiments, adjusting the pressure of the water flowing through the device may further include one of increasing water pressure of the water flowing through the device; decreasing water pressure of the water flowing through the device; and shutting off the water flowing through the device.

In still further embodiments, receiving the sensed pressure of the water flowing through the device at an electronics

DETAILED DESCRIPTION

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the Willis "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As discussed above, regulating water pressure into a customer location is currently done by an onsite contractor that physically changes the water pressure at the customer site. This can be very expensive and time consuming Pressure is the driving energy in water pipes. Thus, reducing and regulating the pressure in the water pipes necessarily leads to a reduction in cost, but the current method of pressure regulation is time consuming and inefficient. Accordingly, some embodiments of the present inventive concept provide a remote pressure regulating device/system to remotely regulate pressure. This pressure regulating system in accordance with embodiments discussed herein may reduce the cost of sending out a contractor to adjust the pressure. Remote pressure regulating devices as discussed herein can be used by, for example, utilities at distribution points or, alternative, at a customer location. Inclusion of these pressure regulating systems may allow more constant pressure to be provided to customer locations, houses, whole neighborhoods and the like. Furthermore, the ability to remotely monitor pressure may also protect the water network from overpressure in some embodiments as will be discussed with respect to FIGS. 1 through 5 herein.

As used herein, a "pressure regulating system" refers to one or more elements associated with a water network that allows pressure to be increased and/or decreased from a remote location based on information received related to water pressure in the water network.

Figure 1:
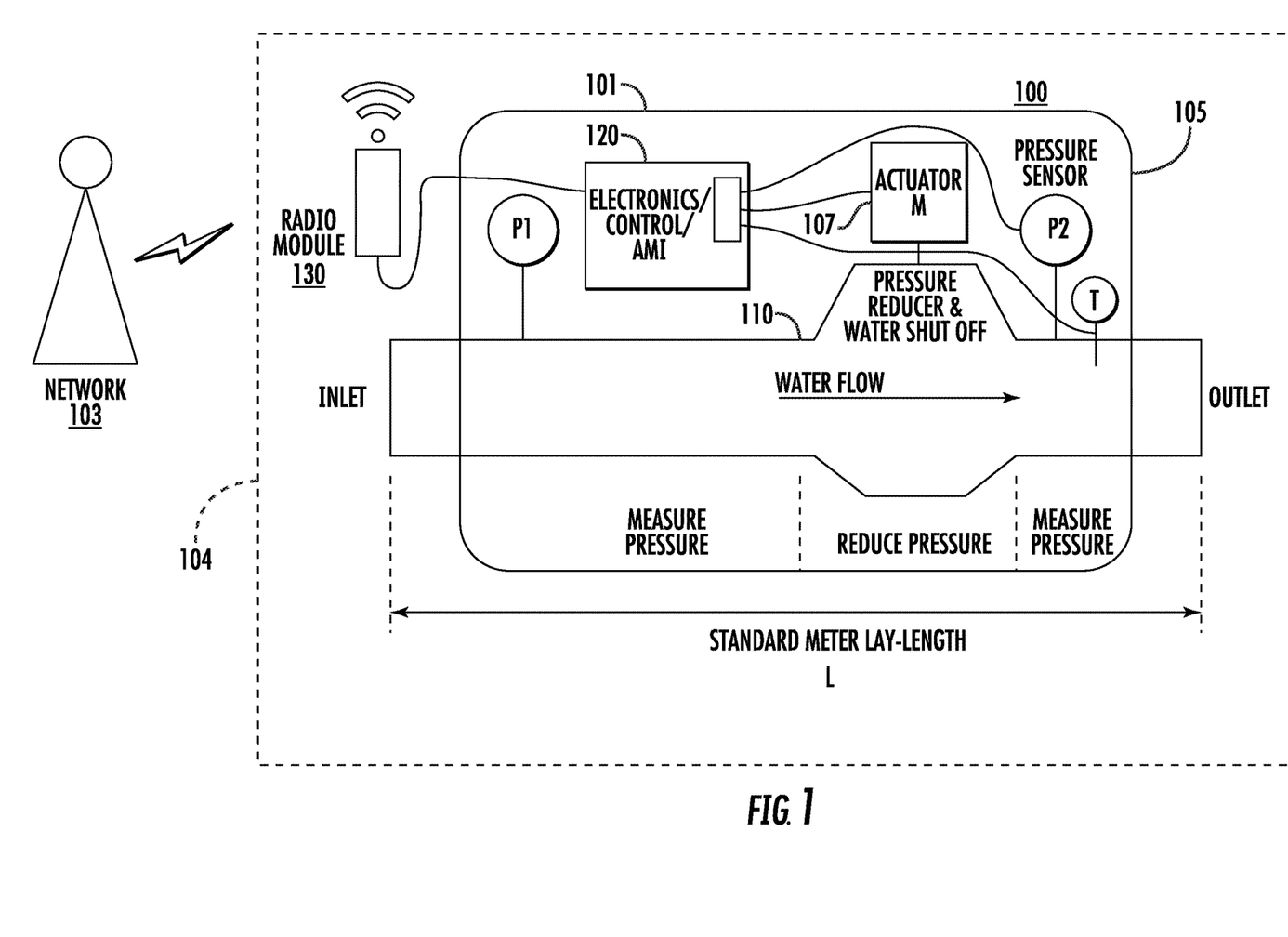
FIG. 1 is a block diagram of a pressure regulating system configured in accordance with some embodiments of the present inventive concept.

Referring now to FIG. 1, a pressure regulating system 100 in accordance with some embodiments of the present inventive concept will be discussed. As illustrated in FIG. 1, the pressure regulating system 100 includes a housing 105 for the pressure regulating device 101. The housing 105 may be made of any material suitable for such a device without departing from the scope of the present inventive concept. The housing 105 includes a pressure control valve 110, an actuator 107, and electronics 120 in communication with a radio module 130. In some embodiments, the pressure regulating system 100 includes some combination of the pressure control valve 110, the actuator 107, the electronics 120 and the radio module 130. As indicated by the dotted line 104, in some embodiments the radio module 130 may be included in the housing 105 without departing from the scope of the present inventive concept. It will be understood that embodiments illustrated in FIG. 1 are provided as examples only and embodiments of the present inventive concept are not limited thereto. For example, more or fewer elements may be included in the pressure regulating system 100 or elements may be combined without departing from the scope of the present inventive concept.

As used herein, "pressure regulating system" refers to the entirety of the elements included in FIG. 1 and "pressure regulating device" refers to elements within the housing

105. In embodiments where the radio module 130 is included in the housing 105, the radio module 130 would be considered part of both the "pressure regulating system" and the "pressure regulating device."

The electronics 120 may include elements configured to receive information from the actuator M 107, temperature sensor T, pressure sensor P1, P2 and the like, process and/or store the information therein and communicate the information to a remote location via the radio module 130 over the network 103. For example, the radio module may communication with a utility's network over the network 103 or Sensus' FlexNet.

Figure 2:
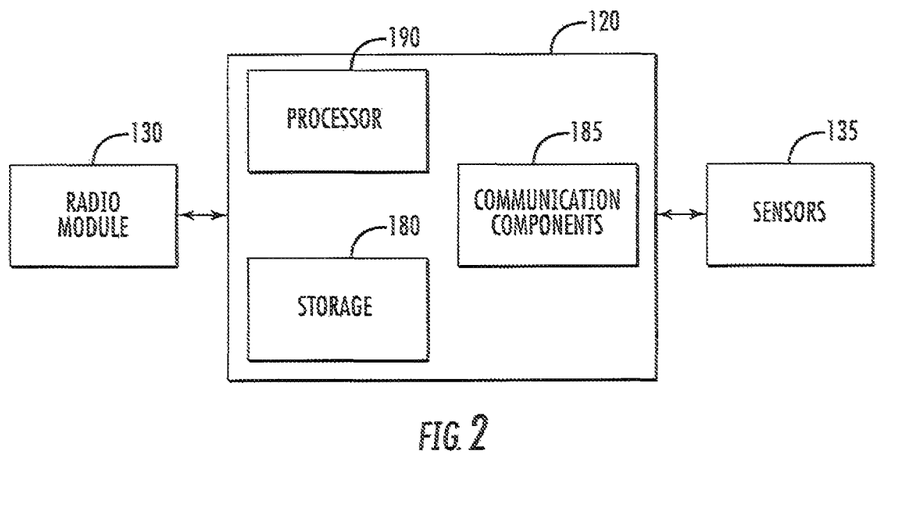
FIG. 2 is a simplified block diagram illustrating electronics and control a pressure regulating device in accordance with some embodiments of the present inventive concept.

As illustrated in FIG. 2 the electronics 120 may include storage 180, a processor 190 configured to receive and process the information from the various sensors 135 in the system 100 and communication components 185. The communication components 185 may facilitate automated, two-way communication between the pressure control system 100 having an Internet protocol (IP) address and a utility company. Thus, the system/device is "smart" having the capability to communicate with other remote devices. It will be understood that FIG. 2 is a simplified block diagram of the electronics 120 and embodiments of the present inventive concept are not limited to the configuration therein.

Referring again to FIG. 1, water flows in, through system 100, in through the INLET into the housing 104 and out through the OUTLET. As will be discussed, embodiments of the present inventive concept allow the pressure of the water flowing through the system 100 to be regulated from a remote location, in contrast to conventional systems discussed above. In particular, the system 100 includes an integrated pressure control valve 110 inside the housing 105 of the pressure regulating device. The pressure control valve 110 may be used to increase and/or decrease water pressure remotely responsive to information received from other devices, for example, a water meter. As illustrated, the pressure control valve 110 is coupled to an actuator M 107, for example, a motor, coil, or other type of actuator that is linked to the electronics 120. The pressure sensor P measures/senses the pressure of the water flowing through the system 100 (INLET to OUTLET) and communicates this pressure information the electronics 120 within the system 100. It will be understood that the information received at the electronics 120 is not limited to pressure information. As discussed above, other sensed/measured information related to the system 100 may be received from sensors, such as a temperature sensor T, without departing from the scope of the present inventive concept. In some embodiments, the system may be battery driven or powered by an external power source without departing from the scope of the present inventive concept.

The electronics 120 communicate with the radio module 130. The sensed/measured information communicated to the electronics 120 in the system 100 may be processed (190, FIG. 2) and communicated to a remote device using the radio module 130. Thus, in accordance with some embodiments discussed herein, the water consumption may be increased/decreased from a remote location if, for example, customers are not paying their bills, the water pressure level is not at a desired level to provide a certain pressure level to houses, and the like. In some embodiments, a pressure regulation valve (PRV) 110 may not be provided in the individual homes or may be provided for emergency purposes only. For example, the system 100 may be provided at various points in the water network to control the pressure to all locations connected therethrough as will be discussed further below with respect to FIG. 4.

Figure 4:
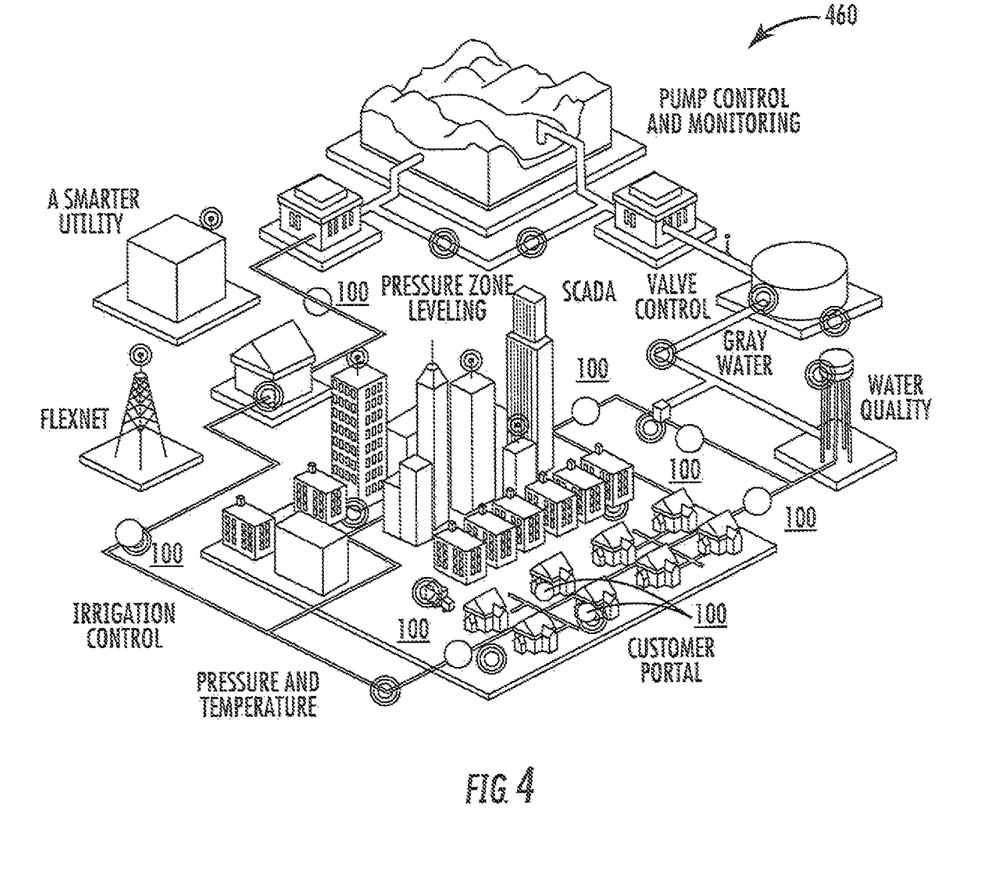
FIG. 4 is a diagram illustrating positioning of a pressure control system in accordance with some embodiments of the present inventive concept.
Figure 5:
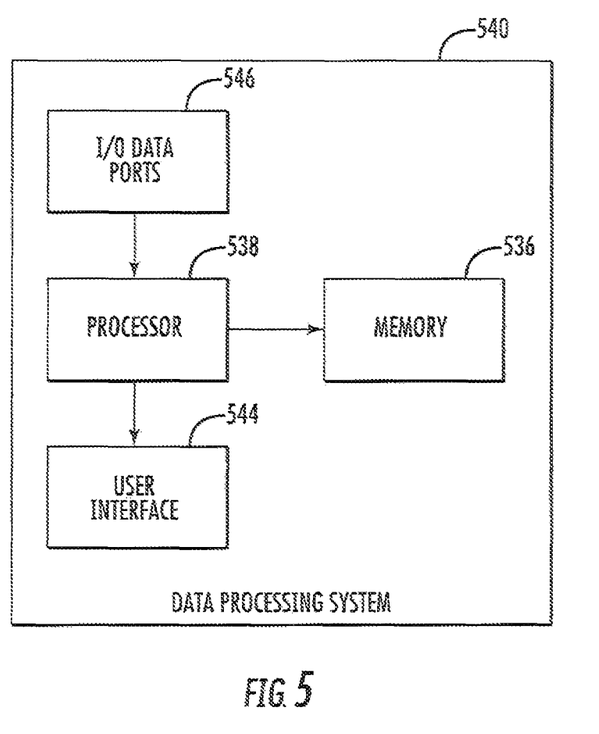
FIG. 5 is a block diagram illustrating a data processing system for use in accordance with some embodiments of the present inventive concept.

Referring to FIG. 4, a diagram of a water network 460 including customer locations will be discussed. As illustrated in FIG. 4, the pressure regulating system/device 100/101 may be positioned anywhere in the water network 460 where it would be useful to control the pressure of the water. In other words, systems may be associated with residential houses, commercial building and distribution points throughout the water network 460. It will be understood that the system 100 may be provided in different sizes, for example, systems used at residential houses may be smaller than systems used at distribution points. Similarly, inlets and outlets and the overall size of the system, for example, ½", ¾", 1", 2", and the like will be dependent on the use case as well as the length of the device.

In some embodiments, systems discussed herein may combine the following features in one: a PRV; a pressure sensor (P1, P2 of FIG. 1); and optional temperature sensor (T of FIG. 1). All elements in the system 100 may be capable of communicating with the radio module 130, i.e. sending and receiving data including pressure and temperature information. Thus, the system 100 may be controlled remotely, for example, desired values can be set and read remotely.

As further illustrated in FIG. 1, in some embodiments, a pressure sensor (P1, P2), a temperature sensor (T) and the like may be provided in a single housing 105. The housing 105 may have a length L, which may differ depending on where the system 100 is positioned and how many meters are coupled thereto. Associating a pressure regulating system that is capable of being controlled remotely as discussed herein with a meter or meters may provide, for example, well-adjusted water pressure, protection from over pressure, the ability to reduce pressure when a water bill is not paid, potential energy savings after evaluating water pressure and adjusting pumps; detection of elevated and low temperatures throughout the network and the like.

Pressure regulating systems 100 in accordance with some embodiments discussed herein are configured to measure water consumption; water temperature and/or water pressure and reduce/increase the pressure down/up to a level where less/more water can be consumed. The system may also regulate the pressure in the consumer's house or corporate environment. For example, by default, it could be set to a certain level such as 60 pounds per square inch (psi). The sensors could detect the pressure and protect the plumbing in the house/building from being exposed to overpressure from, for example, an increase in pressure caused by the utilities and other incidents that cause an increase in water pressure. Pressure is the driving energy in the water pipes. Reducing the water pressure, therefore, reduces the ability to consume/waste it.

Embodiments of the present inventive concept can be used to reduce the pressure down to a desired level where very little water can be consumed. The amount the pressure can be controlled and adjusted remotely. The built-in pressure sensor (P1, P2) illustrated in FIG. 1 indicates the available pressure after the regulator, which is the pressure available to the customer.

As discussed above, the pressure reducing valve illustrated in FIG. 1 may be driven by an actuator M 107 that is linked to the electronics 120 in the device. The benefit of the adjustable pressure is that the pressure can be set to a certain value remotely.

Thus, some embodiments of the present inventive concept provide a pressure regulating system including a pressure reducing valve, pressure sensor and optional temperature sensor. This pressure reducing valve may be used to control water pressure, reduce flow and to possibly prevent over pressure remotely.

Figure 3:
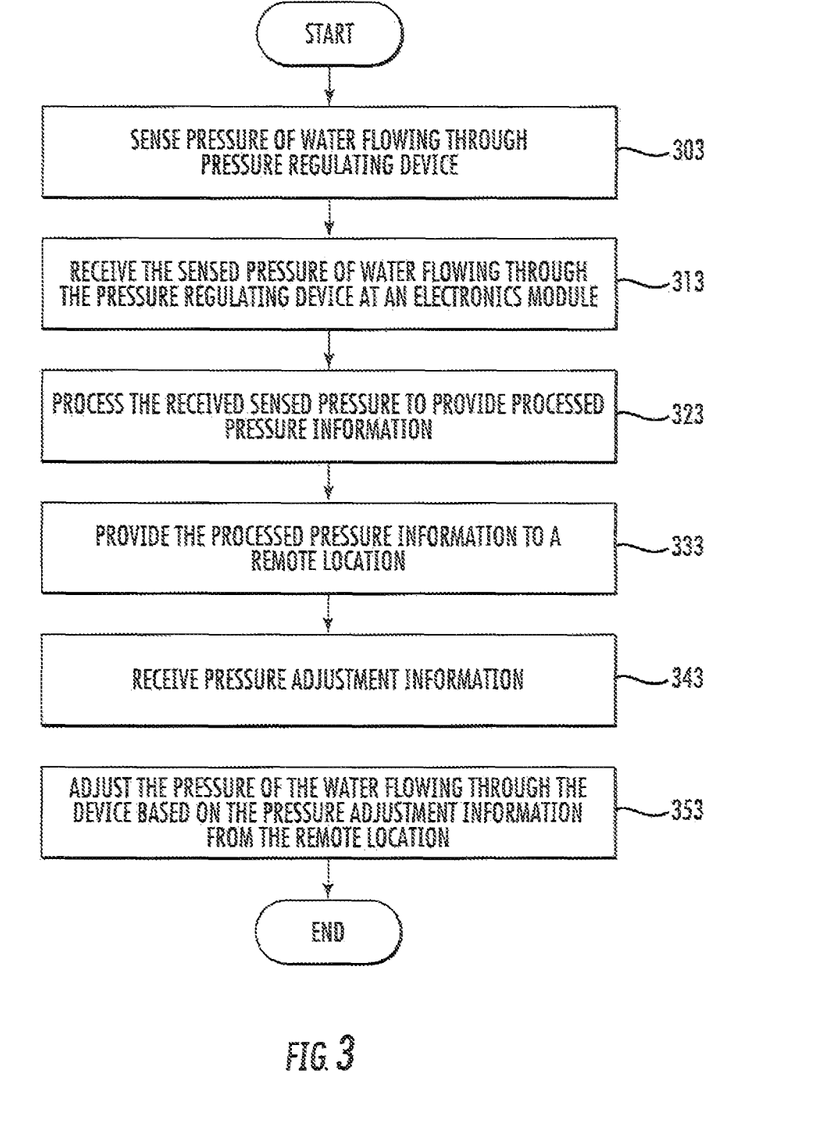
FIG. 3 is a flowchart illustrating operations of a pressure regulation system in accordance with some embodiments of the present inventive concept.

Referring now to FIG. 3, a flowchart illustrating operations of a system for remotely regulating pressure in accordance with some embodiments will be discussed. Operations for remotely adjusting pressure begin at block 303 by sensing pressure of water flowing through a pressure regulating device. It will be understood that embodiments of the present inventive concept are not limited to sensing pressure, for example, a temperature sensor may also be included in the device without departing from the scope of the present inventive concept. The sensed pressure of the water flowing through the device may be received at an electronics module in the device (block 313). The sensed pressure is provided to the electronics module using an actuator as discussed above. The received sensed pressure is processed at the electronics module to provided processed pressure information (block 323). For example, the received sensed pressure may be transformed into data that is consumable by the ultimate destination of the processed pressure information. The processed pressure information is provided to a remote location via a radio module (block 333). Responsive to the processed pressure information, the remote location provides pressure adjustment information, which is received from the remote location via the radio module (block 343). The pressure of the water flowing through the device is adjusted based on the received pressure adjustment information from the remote location (block 353).

It will be understood that operations of blocks 333 and 343 could be performed within the device and not at a remote location without departing from the scope of the present inventive concept.

As discussed above, in some embodiments, other sensors are provided in the pressure regulating device. In these embodiments, the other sensed data, for example, temperature data, may be provided to the electronics module along with the pressure data. This other sensed data may be used along with the pressure data to provide the pressure adjustment data.

Adjusting the pressure of the water flowing through the device may include one of increasing water pressure of the water flowing through the device; decreasing water pressure of the water flowing through the device; and shutting off the water flowing through the device. In some embodiments, the electronics module may be configured to store the information received from the various sensors before processing the information to send to the remote location.

As discussed above, some aspects of the present inventive concept may be implemented by a data processing system. The data processing system may be included in any of the devices discussed herein without departing from the scope of the present inventive concept. For example, the data processing system may be included in the electronics 120 of the device as discussed above. Exemplary embodiments of a data processing system 540 configured in accordance with embodiments of the present inventive concept will be discussed with respect to FIG. 5. The data processing system 540 may include a user interface 544, including, for example, input device(s) such as a keyboard or keypad, a display, a speaker and/or microphone, and a memory 536 that communicate with a processor 538. The data processing system 540 may further include I/O data port(s) 546 that also communicates with the processor 538. The I/O data ports 546 can be used to transfer information between the data processing system 540 and another computer system or a network using, for example, an Internet Protocol (IP) connection. These components may be conventional components such as those used in many conventional data processing systems, which may be configured to operate as described herein.

As discussed briefly above, remote pressure regulating systems discussed herein can reduce operating cost for utilities and cities since the currently manually performed task can be automated. Furthermore, use of the pressure regulating system may provide better control on line pressure and can protect water networks from overpressure. Remote monitoring of temperature will further help to ensure that the temperature in the water network stays below imposed limits Action can be taken remotely if higher pressures or temperatures are detected. Elevated temperatures can be an indication of bacteria growth in water networks and temperatures that are too low can lead to freezing. Pressure that is too high pressure can lead to pipes bursting, flooded homes and other leaks and pressure that is too low generally leads to customer complaints. Although there are conventional devices that can monitor pressure and temperature independently as well as devices that can control pressure, no system existing for remote monitoring and adjusting as discuss in accordance with embodiments discussed herein.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A pressure regulating system, the pressure regulating system comprising:
   a pressure regulating device in a dedicated housing, the pressure regulating device comprising:
   first and second pressure sensors in the dedicated housing that sense pressure of water flowing through the pressure regulating device, the first pressure sensor being positioned at an inlet of the pressure regulating device and a second pressure sensor being positioned at an outlet of the pressure regulating device;
   an actuator in the dedicated housing coupled to the first and second pressure sensors;
   an electronics module in the dedicated housing that receives pressure information related to the sensed pressure from the first and second pressure sensors and processes the received pressure information; and
   a radio module in the dedicated housing that is coupled to a communications network and receives the processed sensor information from the electronics module, communicates the processed sensor information to a remote location and receives pressure adjustment information from the remote location, the received pressure adjustment information being used to adjust water pressure using the actuator in a water network from the remote location.

2. The system of claim 1, wherein the pressure regulating device further comprises a temperature sensor in the dedicated housing and wherein the electronics module is further configured to receive temperature information from the temperature sensor in addition to the pressure information from the first and second pressure sensors and process the received temperature information along with the received pressure information.

3. The system of claim 1, wherein the received pressure adjustment information instructs the electronics module to one of increase water pressure of the water flowing through the device; decrease water pressure of the water flowing through the device; and shut off the water flowing through the device.

4. The system of claim 1, wherein the pressure regulating device is positioned in one of a residential home, a commercial building, a water line and a pump station.

5. The system of claim 1, wherein the electronic module is further configured to store the received pressure information and process the received pressure information to provide the processed pressure information to the remote location via a radio module.

6. A pressure regulating device comprising:
a dedicated housing;
an integrated pressure control valve inside the dedicated housing;
an actuator within the dedicated housing and coupled to the integrated pressure control valve, the integrated pressure control valve configured to receive instructions from a remote location to increase and/or decrease water pressure of water flowing through the device and communicate the received instructions to the actuator,
first and second pressure sensors in the dedicated housing to sense pressure of the water flowing through the device, the first pressure sensor being positioned at an inlet of the pressure regulating device and a second pressure sensor being positioned at an outlet of the pressure regulating device; and
an electronics module in the dedicated housing and coupled to the actuator and configured to receive the sensed pressure of the water flowing through the pressure regulating device and communicate the received pressure of the water flowing through the pressure regulating device to a remote location via a radio module coupled to the device,
wherein the integrated pressure control valve, the first and second pressure sensors, the electronics module and the actuator are provided in the dedicated housing separate from other elements of a system in which the pressure is being sensed.

7. The device of claim 6, wherein the actuator comprises one of a motor, a coil and other type of actuator.

8. The device of claim 6, further comprising a temperature sensor in the dedicated housing coupled to the electronics module, wherein the electronics module is further configured to receive temperature information from the temperature sensor and communicate the received temperature information along with the pressure of the water flowing through the device to a remote location via a radio module coupled to the device.

9. A method of remotely adjusting pressure in a water network using a self-contained pressure regulating device in a dedicated housing, the dedicated housing including a first pressure sensor at an inlet of the pressure regulating device, a second pressure sensor at an outlet of the pressure regulating device, an actuator, an electronics module, and a radio module, the method comprising:
sensing pressure of water flowing through a pressure regulating device using the first and second pressure sensors;
receiving the sensed pressure of the water flowing through the device at an electronics module in the device;
processing the received sensed pressure at the electronics module to provided processed pressure information;
providing the processed pressure information to a remote location via a radio module;
receiving pressure adjustment information from the remote location via the radio module; and
adjusting the pressure of the water flowing through the device based on the received pressure adjustment information from the remote location,
wherein the pressure regulating device including the first and second pressure sensors, the actuator, the electronics module and the radio module are provided in the dedicated housing separate from other elements of a system associated with the pressure regulating device.

10. The method of claim 9, further comprising:
sensing a temperature of the water flowing through the device;
receiving the sensed temperature of the water flowing through the device at the electronics module in the device;
processing the received sensed temperature at the electronics module to provide processed temperature information;
providing the processed temperature information to the remote location via a radio module with the processed pressure information;
receiving pressure adjustment information from the remote location via the radio module responsive to both the processed pressure information and the processed temperature information; and
adjusting the pressure of the water flowing through the device based on the received pressure adjustment information.

11. The method of claim 9, wherein adjusting the pressure of the water flowing through the device comprises one of:
increasing water pressure of the water flowing through the device;
decreasing water pressure of the water flowing through the device; and
shutting off the water flowing through the device.

12. The method of claim 9, wherein the pressure regulating devices are positioned in one of a residential home, a commercial building, a water line and a pump station.

13. The method of claim 9, wherein receiving the sensed pressure of the water flowing through the device at an electronics module in the device is followed by storing the sensed pressure of the water flowing through the device at the electronics module.

\* \* \* \* \*